United States Patent
Keshavamurthy (10) Patent No.: US 11,994,398 B2
(45) Date of Patent: May 28, 2024

(54) SMART PLACEMENT OF MOBILITY AS A SERVICE (MAAS) TRANSIT VEHICLES

(71) Applicant: Toyota Motor Engineering & Manufacturing North America, Inc., Plano, TX (US)

(72) Inventor: Shalini Keshavamurthy, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 991 days.

(21) Appl. No.: 16/449,139

(22) Filed: Jun. 21, 2019

(65) Prior Publication Data

US 2020/0400447 A1    Dec. 24, 2020

(51) Int. Cl.
*G01C 21/00*    (2006.01)
*G01C 21/34*    (2006.01)
(Continued)

(52) U.S. Cl.
CPC ..... *G01C 21/3438* (2013.01); *G01C 21/3415* (2013.01); *G01C 21/3492* (2013.01);
(Continued)

(58) Field of Classification Search
CPC ............ G01C 21/3438; G01C 21/3415; G01C 21/3492; G06Q 10/02; G06Q 50/30; G08G 1/202

See application file for complete search history.

(56) References Cited

U.S. PATENT DOCUMENTS 9,746,332 B2    8/2017    Mukherjee et al.
10,193,774 B2    1/2019    Vidyarthi et al.
(Continued)

FOREIGN PATENT DOCUMENTS

| DE | 102013220023 A1 * | 4/2015 | ......... G01C 21/3415 |
| WO | WO-2015058798 A1 * | 4/2015 | ......... G01C 21/3438 |
| WO | WO2017214237 | 12/2017 | |

OTHER PUBLICATIONS

Wang et al. "Passenger-demands-oriented train scheduling for an urban rail transit network".
(Continued)

*Primary Examiner* — Adam M Alharbi
(74) *Attorney, Agent, or Firm* — SNELL & WILMER LLP (57) ABSTRACT

A system for automatic scheduling of vehicles includes a network access device configured to receive scheduling information corresponding to at least one travel request and including a user-selected starting location and a user-selected destination location. The system further includes a memory configured to store map information including road information and preselected vehicle stops. The system further includes a processor coupled to the network access device and the memory. The processor is designed to identify available vehicles to transport passengers. The processor is further designed to determine routes for the available vehicles to travel, the routes including vehicle stops and being determined based on the scheduling information, the road information, and the preselected vehicle stops. The processor is further designed to control the network access device to transmit the identified routes to the available vehicles.

19 Claims, 8 Drawing Sheets

(51) Int. Cl.
*G06Q 10/02* (2012.01)
*G06Q 50/40* (2024.01)
*G08G 1/00* (2006.01)

(52) U.S. Cl.
CPC ............ *G06Q 10/02* (2013.01); *G06Q 50/40* (2024.01); *G08G 1/202* (2013.01)

(56) References Cited

U.S. PATENT DOCUMENTS

| | | | |
|---|---|---|---|
| 10,895,463 B1* | 1/2021 | Cope | G06Q 10/02 |
| 2009/0326991 A1* | 12/2009 | Wei | G06Q 10/08355 |
| | | | 705/5 |
| 2013/0024249 A1 | 1/2013 | Zohar et al. | |
| 2013/0158846 A1 | 6/2013 | Zhang | |
| 2013/0179205 A1* | 7/2013 | Slinin | G06Q 10/06 |
| | | | 705/7.13 |
| 2015/0066558 A1 | 3/2015 | Kimiagar et al. | |
| 2015/0106006 A1 | 4/2015 | Najafi | |
| 2015/0176997 A1 | 6/2015 | Pursche et al. | |
| 2015/0324945 A1* | 11/2015 | Lord | G06Q 10/06311 |
| | | | 705/7.13 |
| 2015/0325128 A1* | 11/2015 | Lord | G08G 1/202 |
| | | | 705/13 |
| 2017/0169373 A1 | 6/2017 | Roulland et al. | |
| 2017/0300049 A1* | 10/2017 | Seally | G06Q 10/047 |
| 2017/0314942 A1* | 11/2017 | Moncayo Torres | H04W 4/023 |
| 2018/0180423 A1 | 6/2018 | Baverstock et al. | |
| 2018/0188049 A1 | 7/2018 | Shi et al. | |

OTHER PUBLICATIONS

Ma et al. "Mining Smart Card Data for Transient Riders' Travel Patterns".
Ni et al. "DEPART: Dynamic Route Planning in Stochastic Time-Dependent Public Transit Networks".

* cited by examiner

SMART PLACEMENT OF MOBILITY AS A SERVICE (MAAS) TRANSIT VEHICLES

BACKGROUND

1. Field

The present disclosure relates to systems and methods for automatic scheduling and placement of vehicles used for providing mobility services.

2. Description of the Related Art

Vehicles often times provide transportation for users other than owners of the vehicles. This has historically been done by public transportation vehicles such as trains, busses, and airplanes. As cars became more prolific, individual vehicles began being used as taxi cabs to provide rides for individual passengers or small groups of passengers. Recently, ride-sharing applications such as Uber and Lyft have allowed owners of vehicles to become ride-giving professionals using their personal vehicles to transport passengers. Even more recently, mobility services such as Bird have provided non-traditional vehicles (e.g., scooters) to be used for ride-sharing, specifically to cover transportation over relatively short distances.

Although many hoped that the proliferation of public transportation and ridesharing vehicles would decrease traffic and reduce pollution, this has not happened. Many people avoid public transportation due to perceived inefficiencies and large unsupported areas, and ridesharing has not replaced personal vehicles for various reasons.

Current rideshare apps provide limited options for giving a ride to users based on cost, number of passengers, and disabled users. During downtimes, the rideshare drivers are idle and wasting fuel and time and they are randomly driving through an area until they get a ride request. This adds to the congestion problem.

Therefore, it is desirable to develop systems and methods of automatic scheduling and placement of mobility as a service (MAAS) vehicles, including public transportation and ridesharing vehicles, that take advantage of the increase in vehicle technology.

SUMMARY

Described herein is a system for automatic scheduling of vehicles. The system includes a network access device designed to receive scheduling information corresponding to at least one travel request and including a user-selected starting location and a user-selected destination location. The system further includes a memory designed to store map information including road information and preselected vehicle stops. The system further includes a processor coupled to the network access device and the memory. The processor is designed to identify available vehicles to transport passengers. The processor is further designed to determine routes for the available vehicles to travel, the routes including vehicle stops and being determined based on the scheduling information, the road information, and the preselected vehicle stops. The processor is further designed to control the network access device to transmit the identified routes to the available vehicles.

Also described is a system for automatic scheduling of vehicles. The system includes a network access device designed to receive vehicle stop locations corresponding to locations at which vehicles have at least one of stopped for a predetermined amount of time or parked. The system further includes a memory designed to store map information including road information and preselected vehicle stops. The system further includes a processor coupled to the network access device and the memory. The processor is designed to identify available vehicles to transport passengers. The processor is further designed to determine routes for the available vehicles to travel, the routes including vehicle stops and being determined based on the vehicle stop locations, the road information, and the preselected vehicle stops. The processor is further designed to control the network access device to transmit the identified routes to the available vehicles.

Also described is a method for automatic scheduling of vehicles. The method includes receiving, by a network access device, scheduling information corresponding to at least one travel request and including a user-selected starting location and a user-selected destination location. The method further includes storing, in a memory, map information including road information and preselected vehicle stops. The method further includes identifying, by a processor, available vehicles to transport passengers. The method further includes determining, by the processor, routes for the available vehicles to travel based on the scheduling information, the road information, and the preselected vehicle stops, the routes including vehicle stops. The method further includes controlling, by the processor, the network access device to transmit the identified routes to the available vehicles.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for automatic scheduling of vehicles. The systems and methods provide various benefits and advantages such as decreasing transit times and increasing efficiency of public-use vehicles such as public transportation vehicles, rideshare vehicles, or the like. The increased efficiency advantageously encourages ridesharing, which in turn may provide benefits such as reduced traffic, reduced pollution, or the like. The systems and methods provide additional benefits and advantages such as allowing vehicles traditionally used for one purpose (e.g., a school bus) to be used not only for its intended purpose but also for providing mobility services during its off hours. The systems and methods provide the advantage of reducing a quantity of vehicles near events and pedestrian-dense areas, decreasing traffic and congestion at these locations. Another benefit is that the system can cover last-mile transportation from public transportation stops such as by providing a vehicle for individual use from the public transportation stop to a final destination location.

An exemplary system includes a plurality of vehicles which may or may not be mobility as a service (MAAS) vehicles. The vehicles may include various sensors and be capable of transporting one or more passenger. The system may further include a central server. The central server may include a network access device that can receive various pieces of information such as data detected by sensors of the vehicles, a travel request for a user to travel from a starting location to a destination location, traffic information, public transportation schedules, or the like. The central server may further include a memory that stores map data corresponding to maps of a geographical area in which the system provides service. The central server may also include a processor. The processor can identify available MAAS vehicles based on information received from the vehicles. The processor can further determine routes for the available vehicles to travel based on the stored and received data. The routes may be optimized to transport the most people in an efficient manner. The processor may then control the network access device to transmit the routes to the available vehicles so that the vehicles can begin traveling along the assigned routes.

Figure 1:
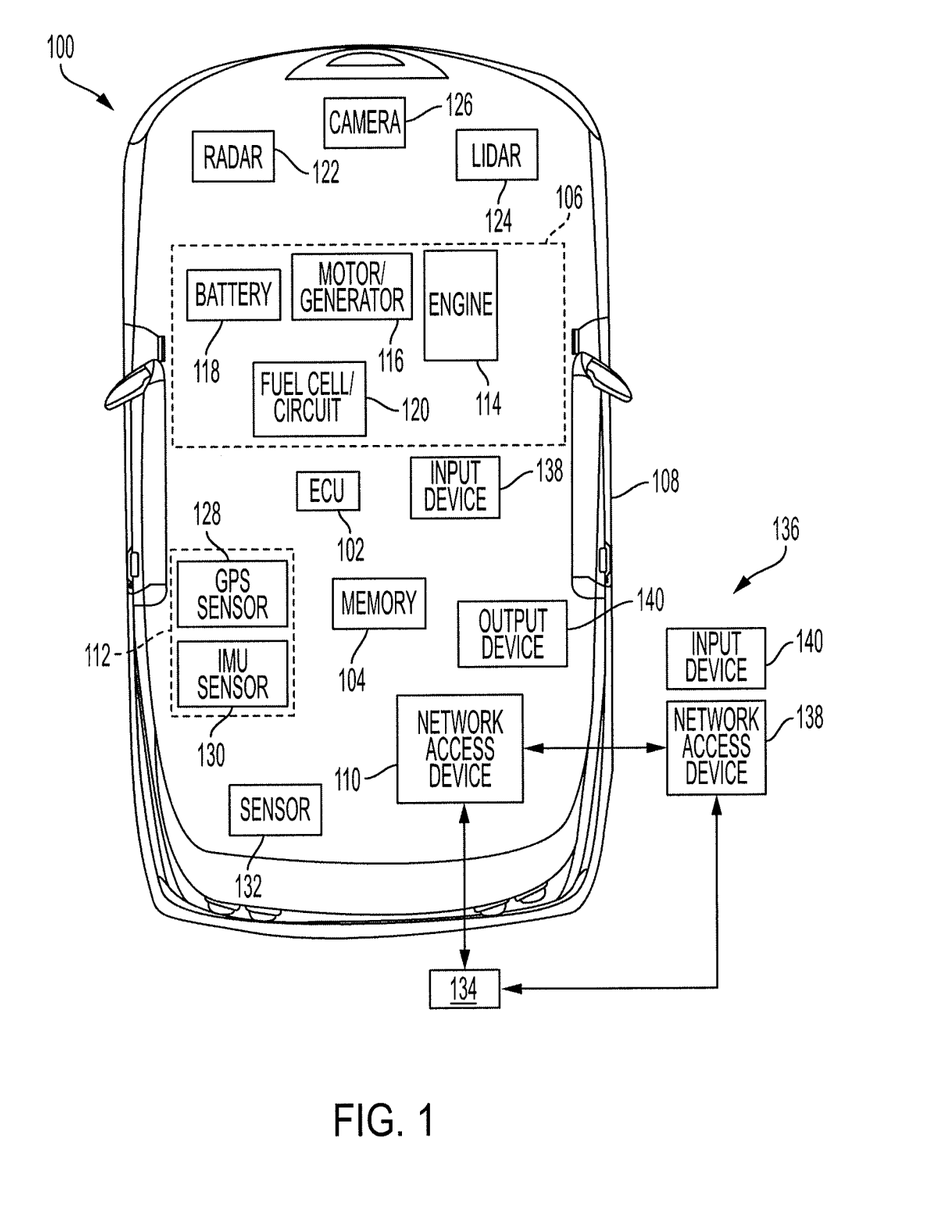
FIG. 1 is a block diagram illustrating a vehicle capable of operating as a mobility as a service (MAAS) vehicle according to an embodiment of the present invention.

Turning to FIG. 1, a vehicle 100 may be used as a MAAS vehicle, meaning that it may transport one or more non-owner passenger between locations, or may be driven by or transport an owner of the vehicle 100. A MAAS vehicle may be any vehicle that transports riders between locations as a service. That is, a user may sign up for transportation service, may pay a fee for the transportation service, or the like. A MAAS vehicle may include, for example, a car, bus, scooter, wheelchair, airplane, boat, helicopter, or the like.

The vehicle 100 (or system 101) may include an ECU 102, a memory 104, a power source 106, and a main body 108. The vehicle 100 (or system 101) may further include a network access device 110, a location sensor 112, a radar sensor 122, a light imaging and ranging (lidar) sensor 124, a camera 126, and another sensor 132. The vehicle may also include an input device 138 and an output device 140.

The main body 108 may be propelled along a roadway, may be suspended in or on water, or may fly through air. The main body 108 may resemble a vehicle such as a car, a bus, a motorcycle, a boat, an aircraft, or the like. The main body 108 may further support one or more individual such as a driver, a passenger, or the like.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be used as a rideshare or other MAAS vehicle in an autonomous, semi-autonomous, or fully driver-operated state. In that regard, the vehicle 100 may be operated independently of driver control and, occasionally, without a person inside of the vehicle 100. For example, the vehicle 100 may receive a request from a user or from a server corresponding to a request for a user ride. The ECU 102 may control the components of the vehicle 100 to travel to the pickup location to pick up the rider and then travel to the destination location. The route may be determined by the ECU 102 or by a remote server.

The memory 104 may include any non-transitory memory and may store data usable by the ECU 102. For example, the memory 104 may store map data, may store user profiles, and may store instructions usable by the ECU 102 to drive autonomously, or the like.

The power source 106 may include any one or more of an engine 114, a motor-generator 116, a battery 118, or a fuel-cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage devices including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The sensor 132 may include one or more of the location sensor 112, the radar sensor 122, the lidar sensor 124, the camera 126, a sensor capable of detecting a status of a vehicle component, a sensor capable of detecting environmental conditions, or the like. For example, the sensor 132 may include a voltage sensor, a current sensor, a temperature sensor, a pressure sensor, a fuel gauge, an airflow sensor, an oxygen sensor, a speed sensor, or the like.

The radar sensor 122, the lidar sensor 124, the camera 126, and the sensor 132 may detect data corresponding to an environment of the vehicle 100. For example, one or more of these sensors may detect the presence of objects near the vehicle 100, may detect a distance between the vehicle 100 and a leading or following vehicle, may detect weather events, may detect traffic information, or the like. The ECU 102 may use this detected data to autonomously control the vehicle 100, to identify landmarks, or the like. In some embodiments, the ECU 102 may transmit the detected data to a server which may analyze the data to control placement and movement of at least one of MAAS vehicles or public transportation vehicles.

The network access device 110 may transmit and receive messages from one or more remote device. The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may communicate with a remote server 134 that may receive data detected by the sensors of the vehicle 100, may transmit routes (including pickup and drop-off locations) to the vehicle 100, or the like.

The network access device 110 may further communicate with a remote device 136. The remote device 136 may be a mobile phone, a tablet, a laptop, or the like. The remote device 136 may be associated with user, and the user may request a ride from the vehicle 100 using the remote device 136. For example, the user may provide a pickup and drop-off location using an input device 138. A network access device may transmit the request to the vehicle 100 or to the server 134, and the vehicle 100 (or the server 134) may identify a route for the vehicle 100 to travel to satisfy the request.

The input device 138 may include any one or more input device such as a button, a keyboard, a mouse, a touchscreen, a microphone, or the like. The input device 138 may receive input from a user of the vehicle 100 such as a driver or a passenger.

The output device 140 may include any output device such as a speaker, a display, a touchscreen, or the like. The output device 140 may output data to a user of the vehicle.

Figure 2:
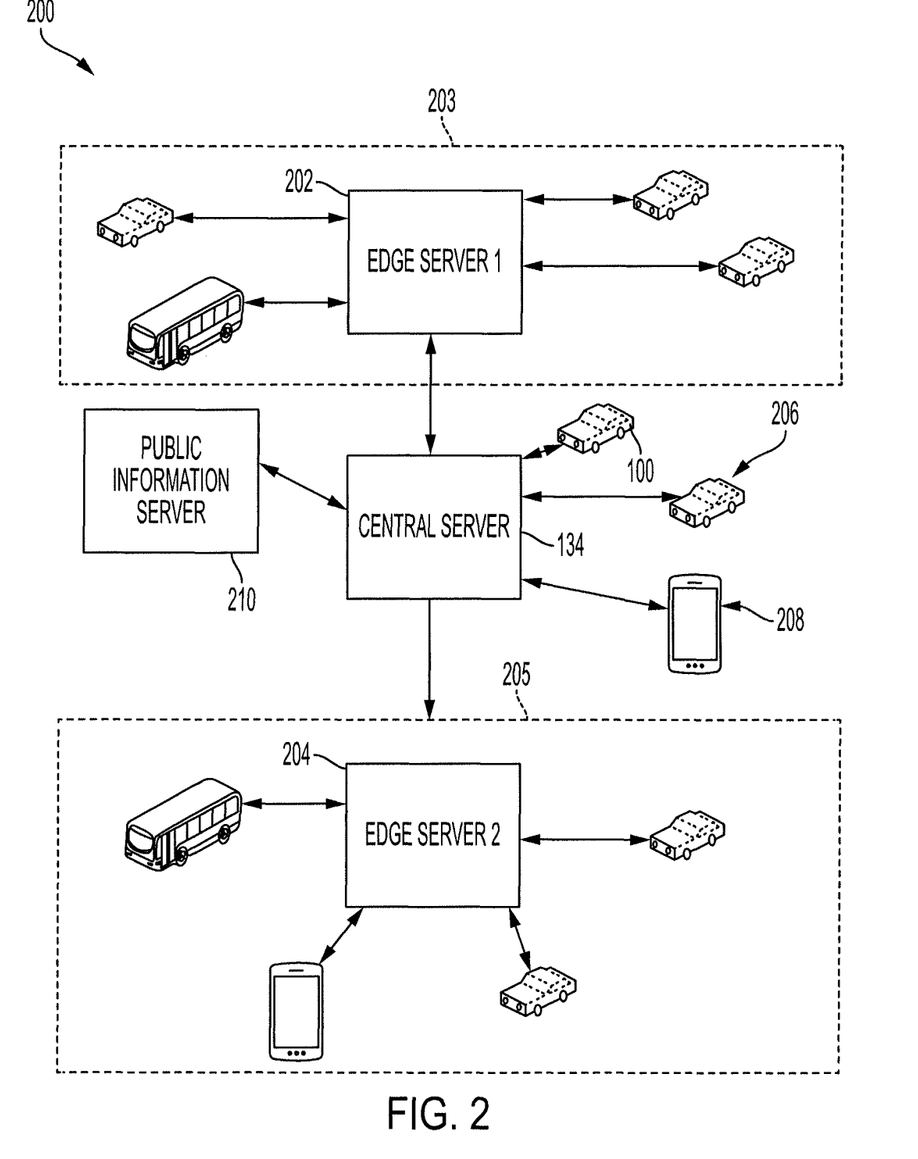
FIG. 2 is a block diagram illustrating a system for automatic scheduling and placement of vehicles according to an embodiment of the present invention.

Referring now to FIG. 2, a system 200 for automatic scheduling of vehicles, such as MAAS vehicles or public transit vehicles, is shown. The system 200 may include one or more vehicles 206 including the vehicle 100. Some or all of the vehicles may be MAAS vehicles, and none or some of the vehicles may be non-MAAS vehicles.

The system 200 may further include one or more server. For example, the server 134 may be a central server which may communicate with one or more edge server such as a first edge server 202 and a second edge server 204. In some embodiments, the central server 134 may control, instruct, or communicate all vehicles within the system 200 and, in some embodiments, the edge servers 202, 204 may control, instruct, or communicate with vehicles within specific assigned geographical areas. For example, the first edge server 202 may communicate with vehicles within a first geographical area 203 and the second edge server 204 may communicate with vehicles within a second geographical area 205. In some embodiments, the central server 134 may determine routes for all vehicles 206 within the system 200, and the edge servers 202, 204 may adjust the routes based on locally detected or received data.

The servers 134, 202, 204 may communicate with each of the vehicles 206 as well as remote devices 208 such as mobile phones, laptops, tablets, personal computers, or the like. One or more of the servers 134, 202, 204 may also communicate with one or more public information server 210.

The central server 134 (or one or both of the edge servers 202, 204) may receive data from the vehicles 206, the remote devices 208, and the public information server 210 and may use an algorithm to determine routes for the vehicles 206 to travel based on the received data. Although the central server 134 is described as receiving the data, one skilled in the art will realize that the data may be transmitted to the central server 134 via one or both of the edge servers 202, 204. The collection of data received by the central server 134 may be referred to as big data and may be analyzed from time to time in order to improve the algorithm or operation of the system 200. Such improvement may reduce travel time between starting locations and destination locations, increase efficiency of the system, or the like.

Each of the vehicles 206 may include features similar to those of the vehicle 100. In that regard, each of the vehicles 206 may include multiple sensors which may detect data corresponding to their environment. This data may include, for example, an amount of vehicle traffic at a specific location, an amount of pedestrian traffic at a specific location, weather conditions (such as rain, snow, sunshine, or the like), road conditions (potholes, slippery surfaces, or the like), locations at which the vehicles 206 have stopped for a predetermined amount of time or powered off, current or historical locations of the vehicles 206, or the like. Some of the vehicles 206 may be rideshare vehicles, MAAS vehicles, or public transportation vehicles. These MAAS vehicles may transmit data to the central server 134 indicating an occupancy level of the vehicle, whether the vehicle is available for ridesharing purposes, dates and times the vehicle will be available for ridesharing purposes, a geographical location of the vehicle, an area within which a driver of the vehicle desires to remain, or the like.

The remote devices 208 may transmit data to the central server 134 corresponding to a desired trip. For example, the remote devices 208 may receive user input requesting transport from a starting location to a destination location. The central server 134 may identify an available vehicle, determine a route for the available vehicle that at least partially satisfies the trip request, and may transmit information to the available vehicle that includes the determined route.

In some embodiments, the travel request may include a premium travel request which may be associated with an increased payment or a preferred customer. Standard travel requests may result in the user having to switch vehicles or walk a portion of the route, while a premium travel request may provide pickup and drop off at the specific starting location and destination location.

The public information server 210 may include one or more related or separate servers or databases which may store publicly available information, which may be received by the central server 134. For example, the public information server 210 may transmit information to the central server 134 such as a calendar of public events (including times, e.g., concerts, public appearances, races, or the like), public transportation schedules (buses, trains, or the like), traffic information, area maps, weather information, road conditions, or the like.

The central server 134 (and/or the first edge server 202 and the second edge server 204) may likewise store additional information in a local memory. For example, the central server 134 may store a map of an area served by the system 200, data received from any remote source, public transportation schedules, user profiles associated with the remote devices 208, or the like.

The central server 134 may aggregate and analyze all of the received data in order to optimize transportation within the area served by the system 200. For example, the central server 134 may identify times at which riders boarded public transportation vehicles as well as occupancy levels of the public transportation vehicles. The central server 134 may also determine new routes and times for the public transportation vehicles based on an analysis of the times and occupancy levels. As another example, a user may provide a request via a remote device 208 corresponding to a travel request by a user. The travel request may include a starting location and a destination location, as well as a pickup time or a desired arrival time. The central server 134 may analyze which vehicles 206 are available and near the starting location, along with public transportation options and occupancy levels of all available vehicles (including public transportation vehicles) within the area. The central server 134 may further determine weather and traffic information and may determine an optimal route for the user based on the received and determined data. The central server 134 may further transmit route data (including pickup and drop-off locations) to the selected vehicle.

Figure 3:
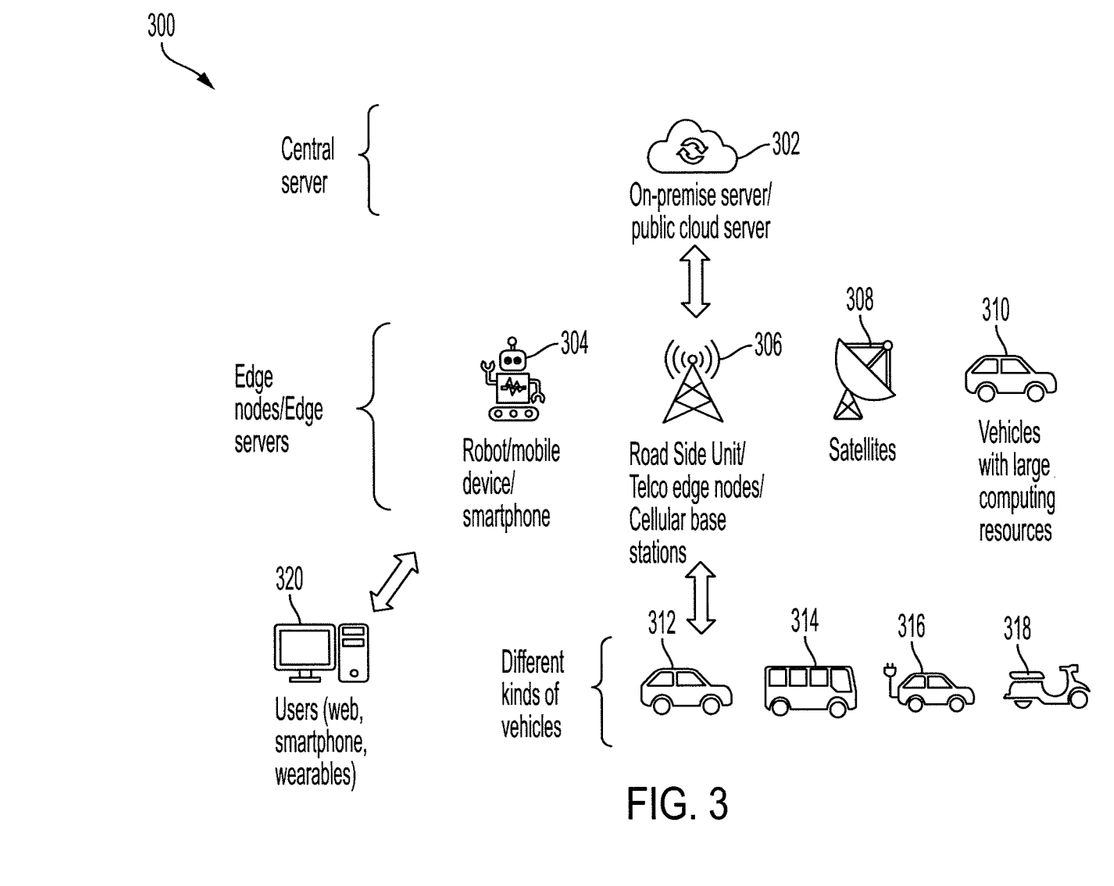
FIG. 3 is an exemplary implementation of the system of FIG. 2 according to an embodiment of the present invention.

Turning now to FIG. 3, an exemplary system 300 for automatic scheduling of vehicles is shown. The system 300 may include similar features as the system 200 of FIG. 2 and may represent an exemplary implementation of the system 200. The system 300 includes a central server 302. The central server 302 may perform similar functions as the central server 134 of FIG. 2. In some embodiments, the central server 302 may be cloud-based. That is, the central server 302 may be accessed by one or more of other servers, remote devices, or vehicles.

The system 300 may further include a plurality of edge servers. The edge servers may be implemented in a variety of devices and may be performed in the background of certain devices. For example, a first edge server 304 may be implemented in a robot, a mobile device, a smart phone, or the like. A second edge server 306 may be implemented in a roadside unit, a telecom edge node, a cellular base station, or the like. A third edge server 308 may be implemented within a satellite communication system such as on board an orbiting satellite, in a ground station designed to communicate via an orbiting satellite, in a land-based portion of a ground-based beamforming satellite communication system, or the like. A fourth edge server 310 may be implemented in a vehicle which may have significant computing resources.

One or more of the central server 302 or the edge servers may communicate with at least one of a remote device 320 associated with a user or with a vehicle. For example, the system 300 may include multiple types of vehicles including personal vehicles, public transportation vehicles, rideshare vehicles, MAAS vehicles (including wheelchairs, scooters, or the like), land-based vehicles, water-based vehicles, air-based vehicles, or the like. The system 300 may include a gas-powered vehicle 312, a public transportation bus 314, an electric vehicle 316, and an electric scooter 318.

Each of the elements of the system 300 may communicate with the central server 302. In that regard, the central server 302 may receive data from one or more of the system elements and may control the vehicles 312, 314, 316, 318 (or transmit information such as routes to the vehicles) based on an analysis of the received data.

Figure 4:
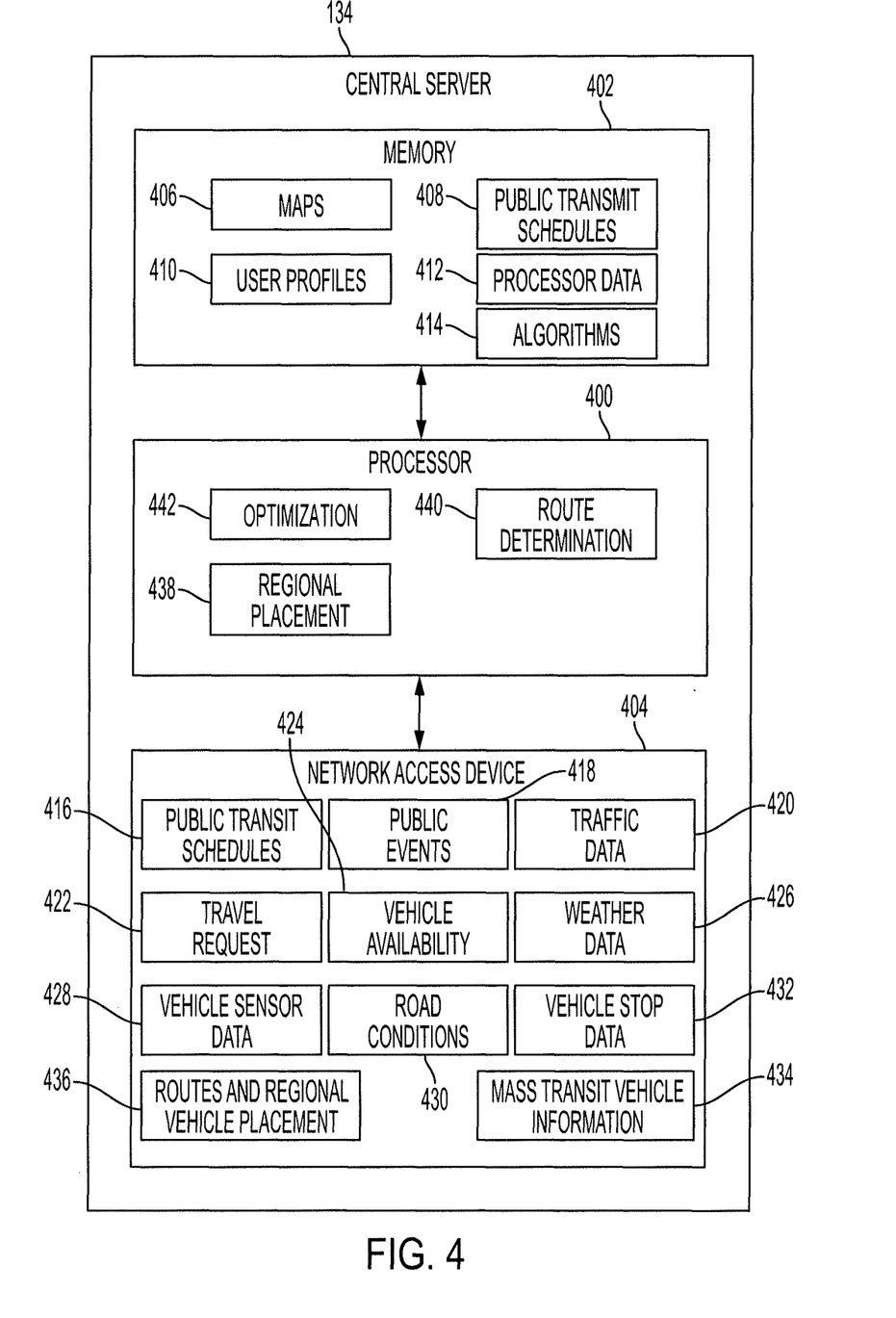
FIG. 4 is a block diagram illustrating features of a central server of the system of FIG. 2 according to an embodiment of the present invention.

Turning to FIG. 4, exemplary features of the central server 134 are shown. The central server 134 may include a processor 400, a memory 402, and a network access device 404.

The memory 402 may be a non-transitory memory and may be designed to store various information as requested by the processor 400 or as programmed into the memory 402. For example, the memory 402 may store map data 406 corresponding to maps of a specific geographical area. The memory 402 may further store public transportation schedules 408 corresponding to up-to-date public transportation schedules within the geographical area. The memory 402 may further store user profiles 410 associated with users of the system 200 of FIG. 2. The memory 402 may further store processor data 412 corresponding to data the processor 400 receives and wishes to store, for example, for later analysis. The memory 402 may likewise store algorithms 414 or other instructions to be executed by the processor 400.

In some embodiments, the algorithms 414 may include artificial intelligence algorithms or other adaptive or optimization algorithms which the processor 400 may adjust based on an analysis of received and determined data as well as results of previous iterations of the algorithms 414. In that regard, the algorithms 414 may include appropriate optimization methods that are not limited to artificial intelligence algorithms. For example, the algorithm 414 may include an optimization algorithm that receives data from all available sources for planning vehicle placements and deciding intermediate stops. In that regard, the processor 400 may change various portions of the algorithms 414. In addition, the vehicle placements and intermediate stops (both new and predetermined placements and stops) may evolve with time and usage based on detected and received data. Also, some machine learning algorithms, such as clustering methods, may be used to find clusters of pickups and drop-offs based on some parameters. Some optimization methods may be used to ensure that the selected routes are efficient with respect to fuel or electricity and terminate relatively close to the destination location.

The network access device 404 may receive various items of information from remote vehicles, remote devices, one or more public information server, or the like. For example, the network access device 404 may receive public transit schedules 416 from a public information server, such as a public transit database. The public transit schedules 416 may include schedules for each public transportation vehicle and a given area and may include stop locations, routes, historical ridership, stop duration, times of vehicle stops, or the like.

The network access device 404 may further receive public events data 418 from a public information server, such as a City Hall website or other information server. The public events data 418 may include dates and times of events, locations of events, expected quantities of people at events, historical public transportation ridership for a comparable event, or the like. For example, the events may include concerts, sporting events, public appearances, or the like.

The network access device 404 may further receive traffic data 420. The traffic data 420 may be received from a public information server or from individual vehicles associated with the system. The traffic data 420 may include density of traffic at given times, historical density of traffic at given times, current flow of traffic at specific locations, or the like. In some embodiments, the traffic data 420 may include a density or quantity of individuals (separate from vehicles) at a given location. For example, a vehicle with a camera may drive by a public transportation pickup location and identify 27 individuals standing at the pickup location. The vehicle may transmit the image data (or the determined quantity of individuals) to the central server 134. As another example, a stop light camera may identify a crowd of people outside of an event venue. The stop light camera may transmit the image data or a quantity or estimate of the individuals in the crowd to the central server 134.

The network access device 404 may further receive a travel request 422. The travel request 422 may include a request by an individual for transportation from a starting location to a destination location and may be received from a remote device. In some embodiments and as described above, the travel request 422 may be a premium travel request. The travel request may include a request for a specific trip or may include a schedule for an upcoming period of time such as a week, a month, a year, or the like.

The network access device 404 may also receive vehicle availability 424. The vehicle availability 424 may be received from an edge server or from individual vehicles. The vehicle availability 424 may include dates and times at which the vehicle is available for providing mobility services, whether the specific vehicle is currently available for providing mobility services, a geographical area in which the vehicle wishes to remain, or the like.

The network access device 404 may further receive weather data 426. The weather data 426 may be received from a public information server, such as a weather service, or from one or more vehicles associated with the system. For example, sensors of a vehicle may detect current traction at a specific location, whether rain is occurring, whether fog is present, or the like. The vehicle may then transmit this information to the central server 134.

The network access device 404 may also receive vehicle sensor data 428 from vehicles associated with the system. For example, the vehicles may provide mobility service to the system or may be individual vehicles which have opted in to sharing information with the system. The vehicle sensor data 428 may include any data detected by sensors of the vehicle. For example, the vehicle sensor data 428 may include radar data, camera data, location data, temperature data, or the like.

The network access device 404 may further receive road condition data 430. The road condition data 430 may be received from individual vehicles or from a public information server. The road condition data 430 may include whether a specific road segment is undergoing maintenance, whether the road segment is closed, whether potholes exist on the road segment, whether streetlights exist on the road segment, whether snow or rain is present on the road segment, or the like.

The network access device 404 may also receive vehicle stop data 432 from individual vehicles. The vehicle stop data may include locations at which the specific vehicle has stopped for a predetermined period of time, locations at which the vehicle has been turned off, locations at which multiple vehicles have stopped (as detected by the multiple vehicles or by a camera of an individual vehicle), or the like.

The network access device 404 may further receive MAAS transit vehicle information 434. The MAAS transit vehicle information 434 may be received from vehicles providing mobility services to the system. The MAAS transit vehicle information 434 may include information such as availability in a specific vehicle, occupancy of the vehicle, previously provided routes of the vehicle, or the like.

As will be discussed in more detail below, the network access device 404 may transmit routes along with regional vehicle placement 436 to the vehicles providing mobility services to the system. For example, the network access device 404 may transmit information to a public transportation bus telling the bus which route to travel along as well as which region to serve on a given day or at a given time.

The processor 400 may include any logic device, processor, controller, or the like capable of performing logic functions. The processor 400 may perform various functions for scheduling routes of MAAS vehicles within the system. For example, the processor 400 may perform a regional placement algorithm 438. Based on the stored and received data, the processor may determine what type and how many vehicles should be located in each region serviced by the system at any given time. For example, if a concert finishes at a first location at 10 PM then the processor 400 may determine that a specific quantity of seats in MAAS vehicles should be available at the location at 10 PM or shortly thereafter. The processor 400 may furthermore receive travel requests corresponding to trips to the concert and may predict the routes to be traveled after the concert. Based on the types and locations of routes, the processor 400 may determine which types of vehicles to send to the concert location. After identifying the regional placement and types of vehicles, the processor 400 may control the network access device 404 to transmit instructions to specific vehicles to travel to the region.

The processor 400 may further perform a route determination algorithm 440. Based on the stored and received data, the processor may determine specific routes for some or all of the vehicles of the system. For example, a public transportation system may indicate that in previous days riders were unable to board a bus at a specific bus stop and time. The processor 400 may identify the specific route of the bus and may designate one or more additional MAAS vehicle to travel along the route at a specific time to ensure all riders can commute.

The processor 400 may further perform an artificial intelligence or other optimization algorithm 442. However, as discussed above, the algorithms may include any artificial intelligence or non-artificial intelligence algorithms. The artificial intelligence algorithm 442 may be performed as part of the route determination algorithm 440 or the regional placement algorithm 438, or may be performed separately from the algorithms 438, 440. The artificial intelligence algorithm 442 may be used to update or improve upon the algorithms 438, 440. For example, the artificial intelligence algorithm 442 may analyze previous performance of the algorithms 438, 440 along with data received or stored by the central server 134 and may make adjustments to the algorithms 438, 440 based thereon. In some embodiments, the artificial intelligence algorithm may be trained based on data detected during operation of the system or may be trained based on previously detected data (such as historical ridership, public transportation delays, previous data detected by individual vehicles, or the like).

Figure 5:
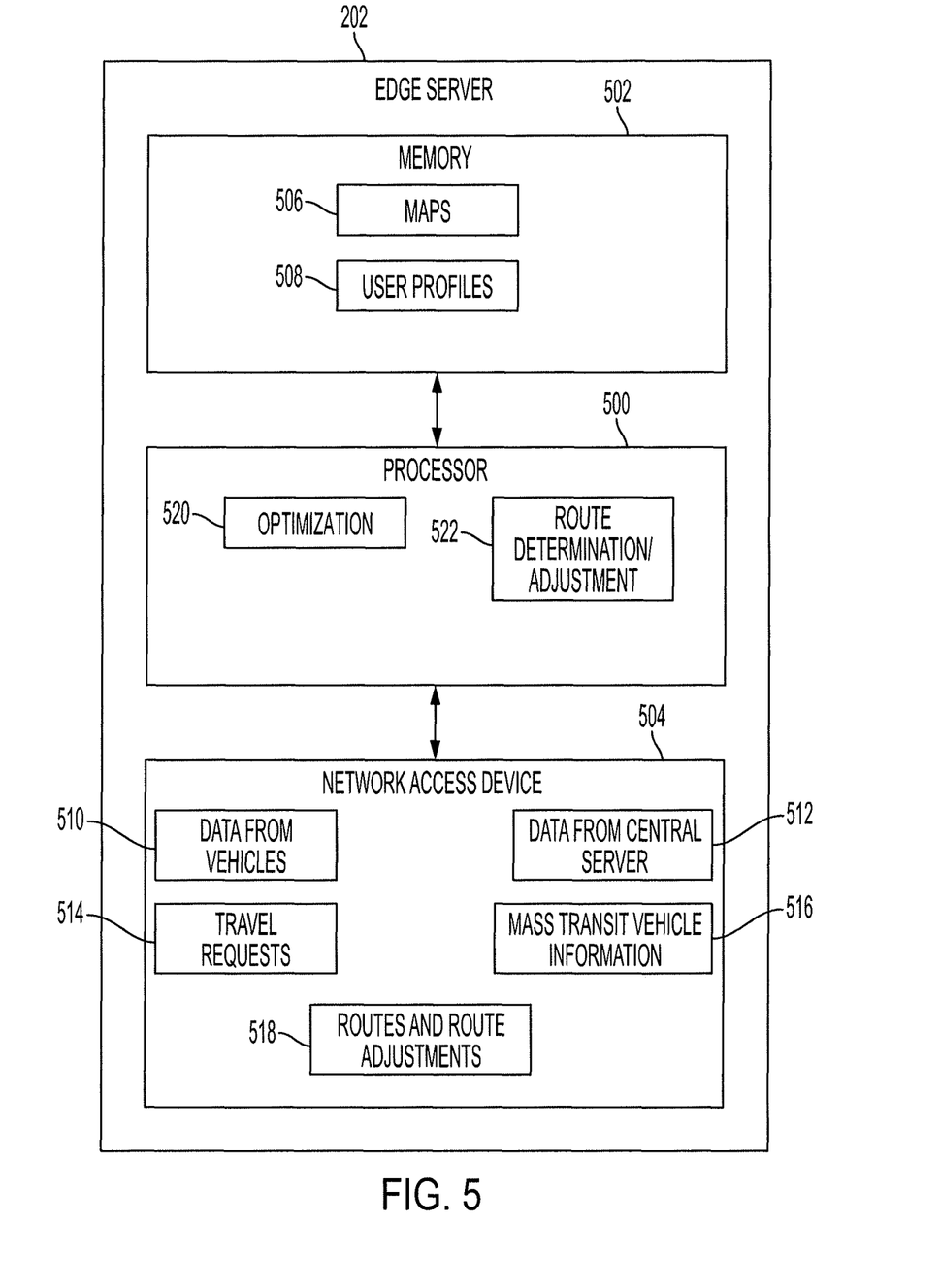
FIG. 5 is a block diagram illustrating features of an edge server of the system of FIG. 2 according to an embodiment of the present invention.

Referring now to FIG. 5, additional details of the edge server 202 are shown. The edge server 202 includes a processor 500, a non-transitory memory 502, and a network access device 504.

The memory 502 may store data. For example, the memory 502 may store data as requested by the processor 500 and as preloaded into the memory 502, as well as instructions usable by the processor 500 to perform logic functions. The memory 502 may store map data 506 along with user profiles 508. In some embodiments, the memory 502 may store any of the same data stored in the memory 402 of FIG. 4. The map data 506 may include similar map data is the map data 406 of FIG. 4 or different data. In some embodiments, the map data 506 may include greater detail and greater granularity than the map data 406 of FIG. 4.

The network access device 504 may receive various information from the central server 134 of FIG. 4, from MAAS and other vehicles associated with the system, from public information servers, or from remote user devices. The network access device 504 may receive some or all of the information received by the network access device 404 of FIG. 4. The network access device may receive all of the information received by the network access device 404 of FIG. 4 and may transmit the data to the network access device 404.

For example, the network access device 504 may receive data from vehicles 510. The information may correspond to data detected by the vehicles, ridership of the vehicles, or the like. The network access device 504 may only receive vehicle data from vehicles associated with a geographical region associated with the edge server 202. In some embodiments, the vehicle data 510 may include greater detail and granularity than vehicle data received by the central server 134 of FIG. 4.

The network access device 504 may further receive data from the central server 512. The central server data 512 may include specific routes assigned by the central server 134 of FIG. 4, or any other data received by or stored in the central server 134. For example, the central server data 512 may include a notification that a large event is occurring within the geographical area assigned to the edge server 202, a notification that additional public transportation vehicles are being assigned to the geographical area, specific routes of vehicles, or the like.

The network access device 504 may further receive travel requests 514. The travel requests 514 may be the same or different than the travel request 422 of FIG. 4.

The network access device 504 may further receive MAAS transit vehicle information 516. The vehicle information 516 may correspond to an availability or status of a specific MAAS transit vehicle. For example, the vehicle information 516 may indicate dates and times at which the specific vehicle is available, a current occupancy of the specific vehicle, an expected occupancy of the vehicle, or the like. For example, a school bus may be used as a MAAS vehicle. In that regard, the school bus may transmit vehicle information 516 that indicates times at which the school bus is transporting schoolchildren and times at which the school bus is available to provide public transportation services.

As will be discussed in further detail below, the network access device 504 may transmit one or more of specific routes or adjustments to specific routes.

The processor 500 may be designed to communicate with the processor 400 of the central server 134 of FIG. 4 and to perform various algorithms to assist in control of the system. For example, the processor 500 may be designed to perform a route determination or adjustment algorithm 522. The processor 500 may further be designed to perform an artificial intelligence or other optimization algorithm 520 separately from or together with the route determination or adjustment algorithm 522.

In some embodiments and as an example, the processor 500 may receive a specific route for a vehicle within its geographical area from the central server 134 of FIG. 4. Based on information available to the edge server 202, the processor 500 may determine that the route may be optimized by some adjustments. In that regard, the processor 500 may determine the adjustments and may control the network access device 504 to transmit the updated route to the vehicle. As another example, the central server 134 of FIG. 4 may determine generalized route information (such as a predicted quantity of people will likely travel from point A to point B between 3 PM and 4 PM) and may transmit the generalized route information to the edge server 202. The edge server 202 may receive specific travel requests 514 and other information that provide greater granularity regarding the likely routes of riders. Based on this information and the generalized route information, the processor 500 may determine specific routes for each of the vehicles within the geographical area and may transmit the routes and timing information to the vehicles.

Figure 6A:
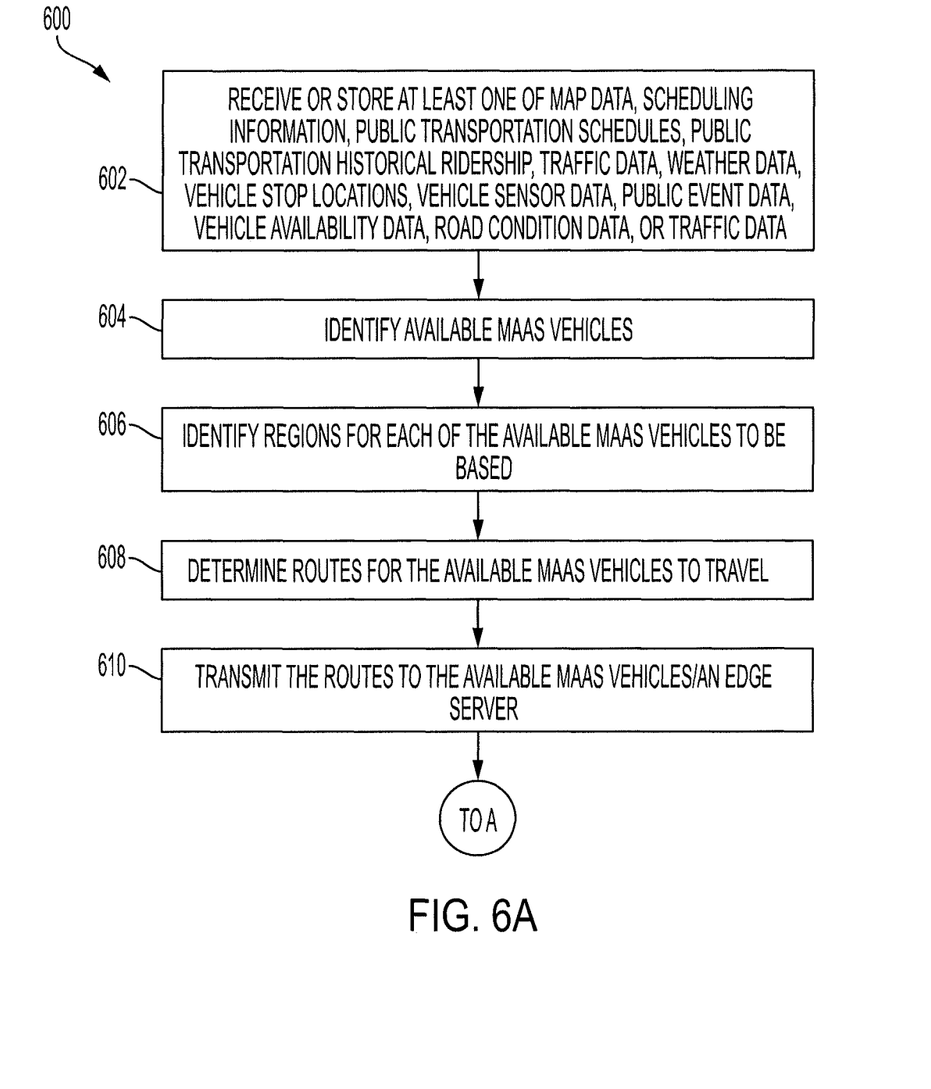
FIGS. 6A and 6B illustrate a method for automatic scheduling and placement of vehicles according to an embodiment of the present invention.
Figure 6B:
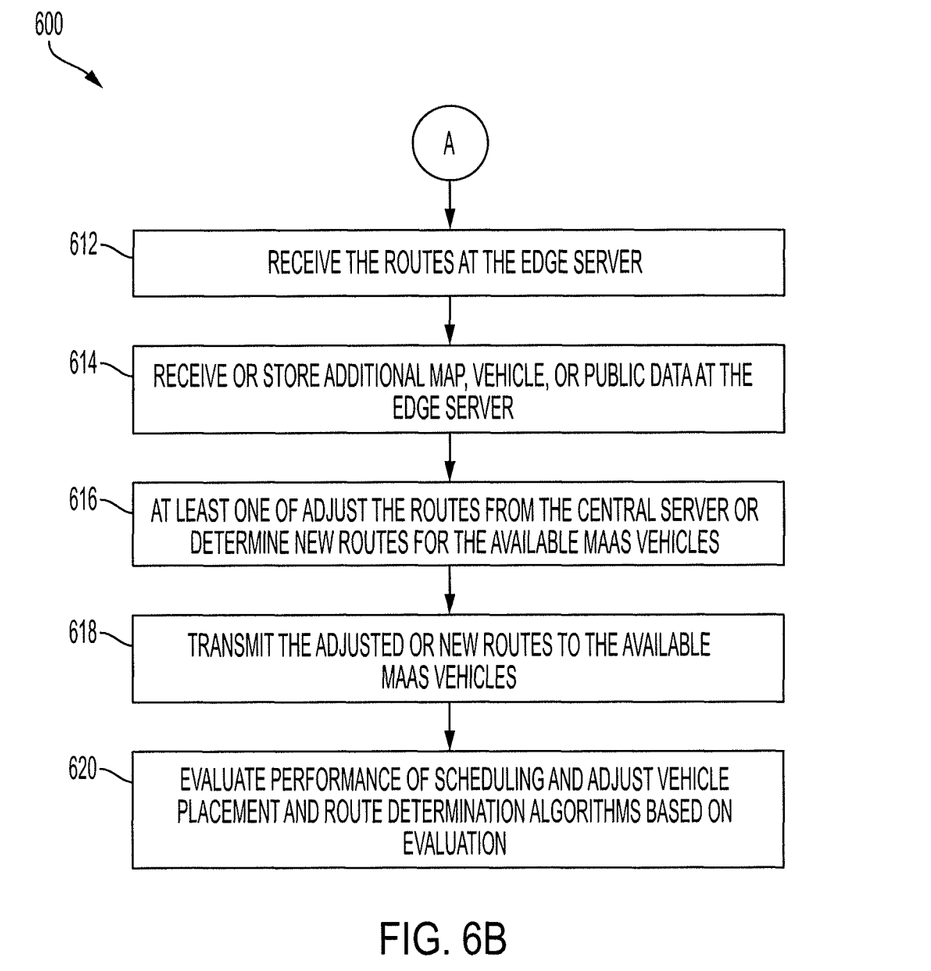

Referring now to FIGS. 6A and 6B, a method 600 for scheduling or placement of MAAS vehicles is shown. The method 600 may be performed by a system similar to the system 200 of FIG. 2.

In some embodiments, users may be provided with some information prior to scheduling a request or using the system for mobility. For example, users may be provided with location and schedule information for vehicles they will be traveling in, optionally other vehicles they can ride in, updated price information for all trips, and warnings and other miscellaneous information.

In block 602, a central server (or an edge server) may receive or store various items of information. This information may include map data, scheduling information, public transportation schedules, public transportation historical ridership, traffic data, weather data, vehicle stop locations, vehicle sensor data, public event data, vehicle availability data, road condition data, traffic data, or the like.

A user may provide travel requests, profile info, preferences, schedules, or the like to the central server through the edge servers or directly, such as using cellular communication.

In block 604, the central server (or edge server) may identify available vehicles for providing mobility services. The server may make this identification based on the data stored or received in block 602. For example, the server may receive notifications from each of the vehicles within the system indicating times of availability for providing mobility services. As another example, the server may query a public transportation system to identify when public transportation vehicles are available for mobility services.

In block 606, the central server may identify regions for each of the available vehicles to be based. The regions may correspond to cities, neighborhoods, or other areas. The central server may identify these regions based on the data received or stored in block 602. For example, if the central server determines that a large event is occurring then the central server may instruct additional vehicles to travel to the area of the large event. As another example, the central server may learn that many people leave work at the same time on a given day. Based on this learning, the central server may instruct additional vehicles to travel to the area around the time of work departures. The central server (or the edge server) may transmit a request for specific vehicles to travel to the determined regions.

In block 608, the central server (or edge server) may determine routes for the available vehicles to travel. This determination may be made based on the stored or received data in block 602. For example, the central server may receive a first travel request from a first starting location to a destination location, and a second travel request from a second starting location to the destination location. The central server may determine that transportation will be optimized by instructing the first user to walk to the second starting location and having the two users share a vehicle from the second starting location to the destination location. Further based on weather, traffic, or other information, the central server may identify an optimal route from the second starting location to the destination location.

In some embodiments, the central server may determine initial vehicles placements during entry of a vehicle into the system. The central server may further periodically or from time to time evaluate operation of the system. In some embodiments, this evaluation may be performed during a downtime. The central server may further be notified of any major disruptions, such as traffic, vehicle breakdown, or the like, and may adjust routes based on this information.

In some embodiments, the vehicles may be designed to provide additional services when not transporting users. For example, the vehicles may provide delivery services, may function as a mobile store (selling groceries, hardware, or the like), may function as a service center (e.g., a tire change center or an oil change center), or the like. In some embodiments, the central server may transmit instructions to the vehicles indicating which services to provide and where to be located to provide such services. When the service is transporting goods, the central server may provide routes for the vehicles to follow including pickup locations and drop off locations.

In block 610, the central server may transmit the determined routes to the available vehicles. In some embodiments, the central server may transmit the determined routes to the edge server to then be transferred from the edge server to the available vehicles.

In block 612, an edge server may receive routes corresponding to its geographical area. These routes may be received from the central server.

In block 614, the edge server may receive or store additional map, vehicle, or public data. In some embodiments, the additional data stored or received by the edge server may include greater detail or greater granularity than the data received or stored in block 602. In some embodiments, the edge server may analyze the specific data from block 614 and may transmit a generalization of the data to the central server. In that regard, the central server may aggregate the data from all edge servers and may make its determinations based on the aggregated data.

The edge servers may store sufficient information to provide services locally in their assigned regions. The information may be updated depending on the priority of the information. That is, the information may be moved to the central server if it is deemed to be valuable in order to more safely protect the information at the central server.

In block 616, the edge server may adjust the routes received from a central server or may determine new routes based on the data received or stored in block 614. For example, the edge server may be aware of a road closure and may adjust routes received from the central server to avoid the closed road segment. The central server may fail to transmit routes and may instead transmit generalized pickup and drop-off locations along with travel requests. In that regard, the edge server may determine routes for the vehicles. The edge server may perform regional vehicle placements in lieu of the edge servers and may make adjustments thereto based on specific user requests, etc.

In block 618, the edge server may transmit the adjusted or new routes to the available vehicles. Upon receipt of the adjusted or new routes (or original routes), an autonomous vehicle may automatically begin driving along the route. In that regard, the route may include a first route portion that includes a route from a current vehicle location to the pickup location, a second route portion that includes a route from the pickup location to the destination location, and a third route portion that includes a route from the destination location to a new pickup location. A semi-autonomous or non-autonomous vehicle may output the routes via an output device, such as a display, so that a driver may drive along the provided routes.

In block 620, the central server (or the edge server) may evaluate the performance of the scheduling system. The evaluation or analysis may be performed based on historical data, data detected or received by vehicles, determined or actual route times, wait times for vehicle pickups, or the like. The analysis may indicate which controls or instructions increase efficiency and which controls or instructions decrease efficiency. Based on the analysis, the server may adjust the vehicle placement and route determination algorithms in order to increase efficiency of the system. The adjustments may be performed by an artificial intelligence algorithm or by another algorithm.

The MAAS vehicles may be updated with information at a predetermined time, or from time to time, by the edge server (e.g., during the daytime), and may be updated by the central server at other times (such as at nighttime). The central server may communicate with or update the MAAS vehicles at any time.

Figure 7:
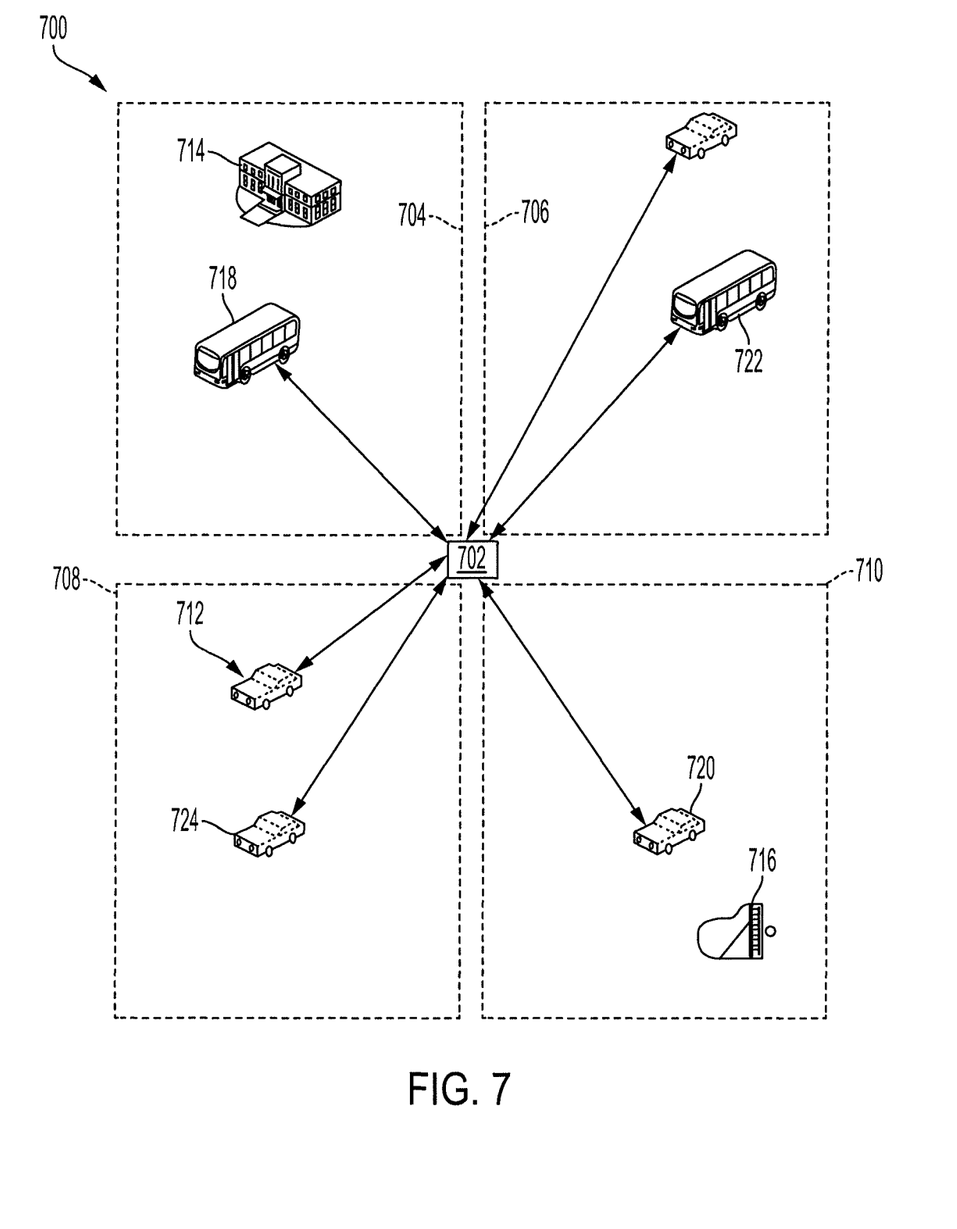
FIG. 7 is a drawing illustrating an exemplary implementation of the method of FIGS. 6A and 6B according to an embodiment of the present invention.

Referring now to FIG. 7, an exemplary implementation of a system 700 for placement of MAAS vehicles is shown. The system 700 includes a central server 702 and a plurality of vehicles 712. The area served by the system 700 may be divided into a first geographical area 704, a second geographical area 706, a third geographical area 708, and a fourth geographical area 710.

The central server 702 may learn that a school 714 in the first geographical area 704 has an afterschool event that occurs until 9 PM, and that a concert 716 in the fourth geographical area 710 will be ending also at 9 PM. The server 702 may determine that a bus 718 in the first geographical area 704 is near the school 714. In that regard, the server 702 may instruct the bus 718 to travel to the school 714 at 9 PM to pick up attendees. The server 702 may further determine that only one MAAS vehicle 720 is located in the fourth geographical area 710. In that regard, the server 702 may instruct a bus 722 to travel from the second geographical area 706 to the fourth geographical area 710, and may instruct one or more vehicle 724 to travel from the third geographical area 708 to the fourth geographical area 710. The server 702 may make adjustments to the route instructions based on data detected or received by the vehicles 712 or by the central server 702 such as increased travel requests in a certain area, traffic information (including human traffic), or the like.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a nonlimiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatic scheduling of vehicles, the system comprising:
   a network access device configured to receive scheduling information corresponding to at least one travel request and including a user-selected starting location and a user-selected destination location, the at least one travel request including a standard travel request requiring a user to switch vehicles or walk a portion of a route and a premium travel request providing a specific pickup location and a specific drop-off location;
   a memory configured to store map information including road information and one or more preselected vehicle stops; and
   a processor coupled to the network access device and the memory and configured to:
      obtain public transportation information relating to at least one of the user-selected starting location or the user-selected destination location, the public transportation information being indicative of occupancy level information of a plurality of public transportation options,
      identify a plurality of available vehicles to transport one or more passengers, the plurality of available vehicles being configured for data communication with, respectively, a plurality of edge servers, each edge server of the plurality of edge servers being configured for communicating with one or more vehicles within a specific geographic region assigned for the each edge server,
      determine a plurality of routes for, respectively, the plurality of available vehicles to travel, the plurality of routes including one or more vehicle stops and at least one route that includes the specific pickup location and the specific drop-off location corresponding to the premium travel request, the plurality of routes being determined based on the scheduling information, the road information, the one or more preselected vehicle stops, and the public transportation information, and
      control the network access device to transmit data corresponding to the determined plurality of routes to the plurality of edge servers for communication of the data corresponding to the determined plurality of routes to, respectively, the plurality of available vehicles.

2. The system of claim 1 wherein:
   at least one of:
      the network access device is further configured to receive public transportation schedule information, or
      the memory is further configured to store the public transportation schedule information; and
   the processor is further configured to determine the plurality of routes for, respectively, the plurality of available vehicles to travel based on the public transportation schedule information.

3. The system of claim 1 wherein the processor is further configured to identify one or more regions for each of the plurality of available vehicles to be located based on the scheduling information, the road information, and the one or more preselected vehicle stops before determining the plurality of routes, and to control the network access device to transmit data corresponding to the identified one or more regions to corresponding one or more of the plurality of available vehicles.

4. The system of claim 1 wherein the network access device is further configured to receive traffic data corresponding to vehicle traffic or human traffic at one or more locations, and the processor is further configured to determine one or more additional routes with one or more additional vehicle stops or to change the one or more vehicle stops of the determined plurality of routes based on the received traffic data.

5. The system of claim 1 wherein the network access device is further configured to receive weather data corresponding to one or more weather events in a predetermined location, and the processor is further configured to determine the plurality of routes further based on the received weather data.

6. The system of claim 1 wherein the network access device is further configured to receive vehicle stop location data corresponding to one or more locations at which one or more independent vehicles have at least one of stopped for a predetermined amount of time or parked, and the processor is further configured to determine one or more additional routes with one or more additional vehicle stops or to change the one or more vehicle stops of the determined plurality of routes based on the received vehicle stop data.

7. The system of claim 1 wherein the network access device is further configured to receive vehicle sensor data corresponding to sensor data detected by one or more sensors on at least one vehicle, and the processor is further configured to determine the plurality of routes further based on the received vehicle sensor data.

8. The system of claim 1 wherein the processor is further configured to perform an artificial intelligence algorithm based on historical data, and to determine the plurality of routes using the artificial intelligence algorithm.

9. The system of claim 1 wherein the plurality of edge servers include an edge server having:
   an edge network access device configured to communicate with the network access device and to receive real-time location data corresponding to at least some of the plurality of available vehicles, and
   an edge processor coupled to the edge network access device and configured to:
      receive the data corresponding to the determined plurality of routes, the scheduling information, the road information, and data corresponding to the one or more preselected vehicle stops via the edge network access device; and
      adjust at least one of the determined plurality of routes based on the real-time location data, the determined plurality of routes, the scheduling information, the road information, and the one or more preselected vehicle stops.

10. A system for automatic scheduling of vehicles, the system comprising:
   a network access device configured to receive data corresponding to a plurality of vehicle stop locations including one or more locations at which one or more vehicles have at least one of stopped for a predetermined amount of time or parked;

a memory configured to store map information including road information and one or more preselected vehicle stops; and a processor coupled to the network access device and the memory and configured to:

obtain travel request information corresponding to at least one travel request including a starting location, a destination location, a standard travel request requiring a user to switch vehicles or walk a portion of a route, and a premium travel request providing a specific pickup location and a specific drop-off location, obtain public transportation information relating to at least one of the starting location or the destination location, the public transportation information being indicative of occupancy level information of a plurality of public transportation options, identify a plurality of available vehicles to transport one or more passengers, the plurality of available vehicles being configured for data communication with, respectively, a plurality of edge servers, each edge server of the plurality of edge servers being configured for communicating with one or more vehicles within a specific geographic region assigned for the each edge server, determine a plurality of routes for, respectively, the plurality of available vehicles to travel, the plurality of routes including one or more vehicle stops and at least one route that includes the specific pickup location and the specific drop-off location corresponding to the premium travel request, the plurality of routes being determined based on the plurality of vehicle stop locations, the road information, the one or more preselected vehicle stops, and the public transportation information, and control the network access device to transmit data corresponding to the determined plurality of routes to the plurality of edge servers for communication of the data corresponding to the determined plurality of routes to, respectively, the plurality of available vehicles.

11. The system of claim 10 wherein the network access device is further configured to receive scheduling information corresponding to the at least one travel request, and the processor is further configured to determine the plurality of routes based on the scheduling information.

12. The system of claim 10 wherein:

at least one of:

the network access device is further configured to receive public transportation schedule information, or the memory is further configured to store the public transportation schedule information; and the processor is further configured to determine the plurality of routes for, respectively, the plurality of available vehicles to travel based on the public transportation schedule information.

13. The system of claim 10 wherein the processor is further configured to identify one or more regions for each of the plurality of available vehicles to be located based on scheduling information, the road information, and the one or more preselected vehicle stops before determining the plurality of routes, and to control the network access device to transmit data corresponding to the identified one or more regions to corresponding one or more of the plurality of available vehicles.

14. The system of claim 10 wherein the network access device is further configured to receive traffic data corresponding to vehicle traffic or human traffic at one or more locations, and the processor is further configured to determine one or more additional routes with one or more additional vehicle stops or to change the one or more vehicle stops of the determined plurality of routes based on the received traffic data.

15. The system of claim 10 wherein the processor is further configured to determine one or more additional routes with one or more additional vehicle stops or to change the one or more vehicle stops of the determined plurality of routes based on the received plurality of vehicle stop locations.

16. The system of claim 10 wherein the plurality of edge servers include an edge server having:

an edge network access device configured to communicate with the network access device and to receive real-time location data corresponding to at least some of the plurality of available vehicles, and an edge processor coupled to the edge network access device and configured to:

receive the data corresponding to the determined plurality of routes, scheduling information, the road information, and data corresponding to the one or more preselected vehicle stops via the edge network access device; and adjust at least one of the determined plurality of routes based on the real-time location data, the determined plurality of routes, the scheduling information, the road information, and the one or more preselected vehicle stops.

17. A method for automatic scheduling of vehicles, the method comprising:

receiving, by a network access device, scheduling information corresponding to at least one travel request and including a user-selected starting location and a user-selected destination location, the at least one travel request including a standard travel request requiring a user to switch vehicles or walk a portion of a route and a premium travel request providing a specific pickup location and a specific drop-off location;

storing, in a memory, map information including road information and one or more preselected vehicle stops;

obtaining, by a processor, public transportation information relating to at least one of the user-selected starting location or the user-selected destination location, the public transportation information being indicative of occupancy level information of a plurality of public transportation options;

identifying, by the processor, a plurality of available vehicles to transport one or more passengers, the plurality of available vehicles being configured for data communication with, respectively, a plurality of edge servers, each edge server of the plurality of edge servers being configured for communicating with one or more vehicles within a specific geographic region assigned for the each edge server;

determining, by the processor, a plurality of routes for, respectively, the plurality of available vehicles to travel based on the scheduling information, the road information, the one or more preselected vehicle stops, and the public transportation information, the plurality of routes including one or more vehicle stops and at least one route that includes the specific pickup location and the specific drop-off location corresponding to the premium travel request; and controlling, by the processor, the network access device to transmit data corresponding to the determined plurality of routes to the plurality of edge servers for communication of the data corresponding to the determined plurality of routes to, respectively, the plurality of available vehicles.

18. The method of claim 17 further comprising receiving, by the network access device, at least one of (i) vehicle stop location data corresponding to one or more locations at which one or more vehicles have at least one of stopped for a predetermined amount of time or parked or (ii) vehicle sensor data corresponding to sensor data detected by one or more sensors on at least one vehicle, wherein determining the plurality of routes includes determining the plurality of routes based on the at least one of the vehicle stop location data or the vehicle sensor data.

19. The method of claim 17 further comprising:
receiving, by the network access device, traffic data corresponding to at least one of vehicle traffic or human traffic at one or more locations; and
at least one of:
  determining, by the processor, one or more additional routes with one or more additional vehicle stops based on the traffic data; or
  changing, by the processor, the one or more vehicle stops of the determined plurality of routes based on the traffic data.

* * * * *